(12) United States Patent
Miyazaki

(10) Patent No.: US 6,275,667 B1
(45) Date of Patent: Aug. 14, 2001

(54) IMAGE FORMING APPARATUS AND IMAGE FORMING SYSTEM

(75) Inventor: Satoru Miyazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/635,494

(22) Filed: Aug. 9, 2000

(30) Foreign Application Priority Data

Aug. 12, 1999 (JP) .................................................. 11-228636
Jul. 27, 2000 (JP) .................................................. 12-227429

(51) Int. Cl.[7] .................................................. G03G 21/02
(52) U.S. Cl. .............................. 399/79; 358/474; 399/15
(58) Field of Search ............................ 399/79, 75, 80, 399/15; 358/474, 296, 300

(56) References Cited

U.S. PATENT DOCUMENTS

| 4,313,673 | * | 2/1982 | Wartinger et al. | 399/79 X |
| 5,185,634 | * | 2/1993 | Kaisha | 399/79 |
| 5,383,129 | * | 1/1995 | Farrell | 399/79 X |
| 5,602,939 | * | 2/1997 | Hashiguchi et al. | 399/15 X |
| 5,884,118 | * | 3/1999 | Mestha et al. | 399/15 |
| 6,173,088 | * | 1/2001 | Koh et al. | |

FOREIGN PATENT DOCUMENTS

| 5-12412 | * | 1/1993 | (JP) . |
| 10-224593 | | 8/1998 | (JP) . |

* cited by examiner

*Primary Examiner*—Susan S. Y. Lee
(74) *Attorney, Agent, or Firm*—Oliff & Berridge PLC

(57) ABSTRACT

There is provided an image forming apparatus which can correctly recognize a function substantially used by a user. The image forming apparatus is provided with an image input portion for reading a read original document as image data, an image output portion for forming an output image on the basis of inputted image data and prints it out, a discrimination portion for discriminating whether the output image formed by the image output portion is formed on the basis of the image data read by the image input portion, a billing amount calculation portion for calculating a billing amount on the basis of a discrimination result of the discrimination portion, and a system control portion for controlling the entire operation of the image forming apparatus.

10 Claims, 2 Drawing Sheets

IMAGE FORMING APPARATUS AND IMAGE FORMING SYSTEM

BACKGROUND OF THE INVENTION

1. Field of the Invention

The present invention relates to an image forming apparatus such as a copying machine, and an image forming system.

2. Description of the Related Art

In recent years, with the extension of user's needs, an image forming apparatus typified by a copying machine has been improved in a multifunction and a network. Such an image forming apparatus makes it possible to independently operate an image reading portion for reading an original document as image data and an image output portion for forming an output image based on the inputted image data and for printing it out. That is, the user can use a function (hereinafter referred to as a scan function) in which an original document is read as image data and the image data is outputted, a function (hereinafter referred to as a print function) in which an output image is formed on the basis of image data transmitted from a host apparatus connected to a network or the like and is printed out, a function (hereinafter referred to as a copy function) in which an output image is formed on the basis of image data read out of an original document and is printed out, or the like.

For example, Japanese Patent Unexamined Publication No. Hei. 10-224593 discloses an image forming apparatus which is provided with the copy function, the facsimile function, and the print function, and in which use fees for the respective functions are added up and are billed to the user.

However, the conventional image forming apparatus disclosed in the above publication has problems as set forth below. That is, in the case where the image forming apparatus is connected to a network, there is often a case where image data read by using the scan function of the image forming apparatus is once transmitted to a host apparatus, the image data edited and processed by the host apparatus is again transmitted to the image forming apparatus, and an output image is formed from the image data by using the print function of the image forming apparatus and is printed out. In this instance, there is a case where although it is equivalent to the use of the copy function from the viewpoint of the user, the image forming apparatus judges that the print function is used, so that the function substantially used by the user can not be correctly recognized, and the proper billing amount can not be calculated.

SUMMARY OF THE INVENTION

The present invention has been made in view of the above circumstances and provides an image forming apparatus which can correctly recognize a function substantially used by a user.

In order to solve the problem, an image forming apparatus of the present invention includes an image reading unit for reading an original document as image data, an image output unit for forming an output image on the basis of inputted image data and for printing it out, and a discrimination unit for discriminating whether the output image is formed on the basis of the image data read by the image reading unit.

Since the discrimination unit is provided, it becomes possible to recognize that the output image is formed on the basis of the image data read by the image reading unit and is printed out, or the output image is formed on the basis of image data other than the image data read by the image reading unit and is printed out.

Besides, the image forming apparatus of the present invention further includes a billing amount calculation unit for calculating, on the basis of a discrimination result of the discrimination unit, a billing amount for use of a function of reading the original document as the image data and/or a function of forming and printing out the output image.

Since the billing amount calculation unit is provided, it becomes possible to calculate a proper billing amount in respective cases, that is, the case where both the function of reading the original document as the image data and the function of forming and printing out the output image are used, and the case where only the function of forming and printing out the output image is used.

Besides, in the image forming apparatus of the present invention, when the output image is formed on the basis of the image data read by the image reading unit and is printed out, the billing amount calculation unit adds a billing amount for the use of the function of reading the original document as the image data and the function of forming and printing out the output image, and when the output image is formed on the basis of the image data other than the image data read by the image reading unit and is printed out, the billing amount calculation unit adds a billing amount for the use of the function of forming and printing out the output image.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Figure 1:
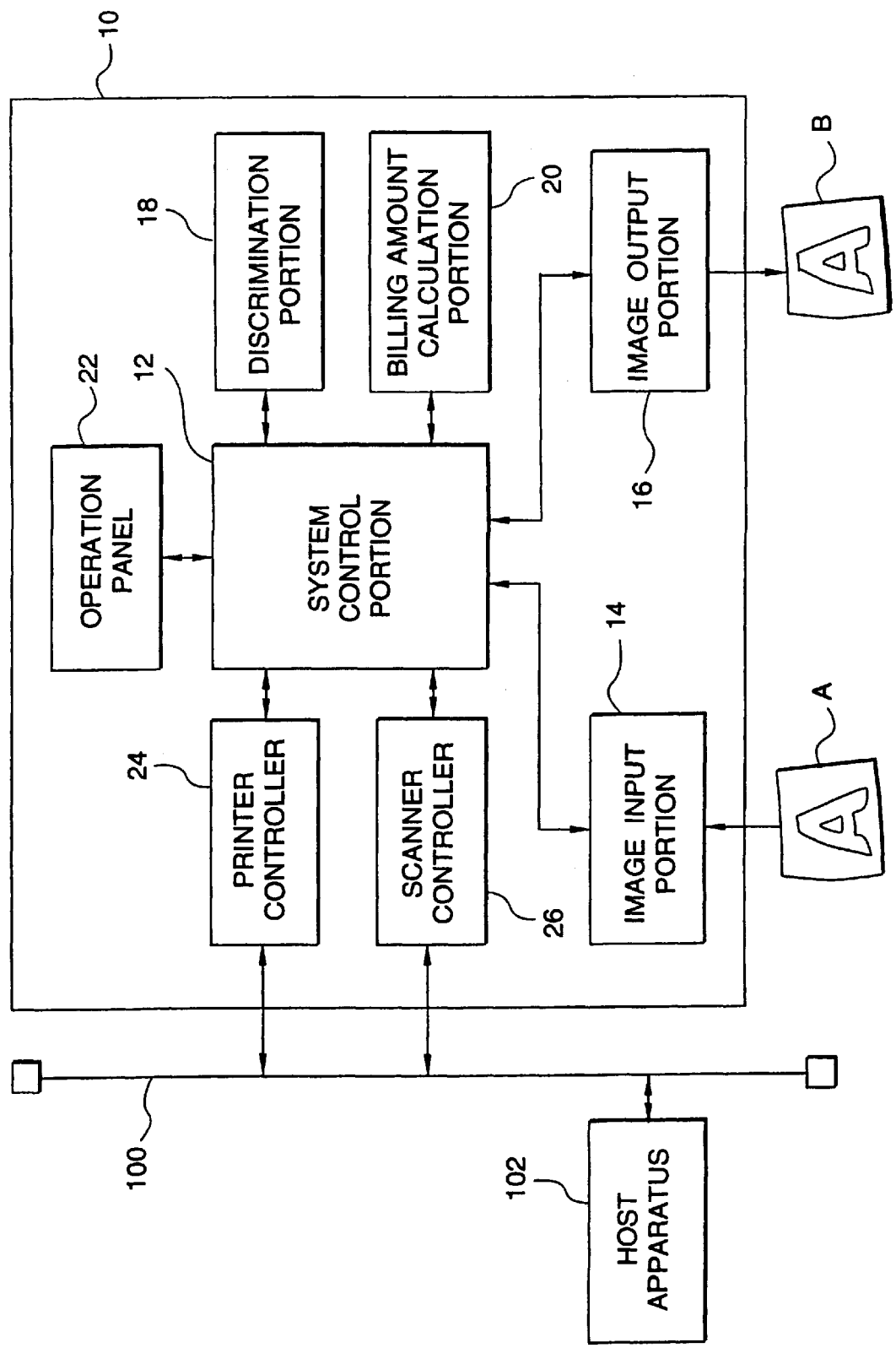
FIG. 1 is a structural view of an image forming apparatus.

An image forming apparatus of an embodiment of the present invention will be described with reference to the drawing. First, a structure of the image forming apparatus of the embodiment will be described. FIG. 1 is a structural view of an image forming apparatus 10 of the embodiment.

As shown in FIG. 1, the image forming apparatus 10 includes a system control portion 12, an image input portion 14, an image output portion 16, a discrimination portion 18, a billing amount calculation portion 20, an operation panel 22, a printer controller 24, and a scanner controller 26. Further, the image forming apparatus 10 is connected to a host apparatus 102 through a network 100. Respective structural components will be described below in detail.

The image input portion 14 reads a read original document as image data on the basis of a read instruction from the system control portion 12. The image input portion 14 outputs the read image data to the system control portion 12.

The image output portion 16 inputs the image data outputted from the system control portion 12, and forms an output image on the basis of the inputted image data. Besides the image output portion 16 prints out the output image on a sheet B. Further, every time the printout for one sheet is completed, the image output portion 16 notifies the system control portion 12 that the printout is normally completed.

The discrimination portion 18 discriminates whether the output image formed by the image output portion 16 is formed on the basis of the image data read by the image input portion 14. Specifically, the discrimination portion 18 inputs information as to the image data outputted to the image output portion 16 from the system control portion 12, and in the case where the image data is the image data read by the image input portion 14, the discrimination portion notifies the system control portion 12 that the used function is "copy function". On the other hand, in the case where the image data outputted to the image output portion 16 from the system control portion 12 is not the image data read by the image input portion 14 (for example, in the case where it is image data read by another image forming apparatus connected to the network 100, in the case where it is image data newly generated by the host apparatus 102, and so on), the discrimination portion 18 notifies the system control portion 12 that the used function is "print function". For example, in the case where the image data read by the image input portion 14 is transmitted to the host apparatus 102 through the system control portion 12, the network 100, and the like, and after it is edited and processed by the host apparatus 102, it is again transmitted to the image output portion 16 through the network 100, the system control portion 12, and the like, and the output image is formed by the image output portion 16 on the basis of the image data and is printed out, since the image data is the image data read by the image input portion 14, the discrimination portion 18 notifies the system control portion 12 that the used function is "copy function".

The billing amount calculation portion 20 inputs information as to the used function notified from the discrimination portion 18 to the system control portion 12, that is, information as to whether the used function is "copy function" or "print function", and calculates a billing amount for the use of the function. More particularly, in the case where "copy function" is used, a billing amount for the use of "copy function" is added, and in the case where "print function" is used, a billing amount for the use of "print function" is added. Incidentally, the addition of the billing amount is performed every time the printout for one sheet from the image output portion 16 is completed. The billing amount calculation portion 20 notifies the system control portion of the calculated billing amount.

The operation panel 22 receives instructions of the user as to function selection or the like and notifies the system control portion 12, and displays the selected function, billing amount, operation state of the image forming apparatus 10, and the like on the basis of information outputted from the system control portion 12.

With respect to the operation of the image output portion 16, the printer controller 24 mediates information between the system control portion 12 and the network 100 or the host apparatus 102. Similarly, with respect to the operation of the image input portion 14, the scanner controller 26 mediates information between the system control portion 12 and the network 100 or the host apparatus 102.

The system control portion 12 controls the entire operation of the image forming apparatus 10, and controls the communication of information with the image input portion 14, the image output portion 16, the discrimination portion 18, the billing amount calculation portion 20, the operation panel 22, the printer controller 24, and the scanner controller 26.

Subsequently, the operation of the image forming apparatus of this embodiment will be described. The image forming apparatus 10 is operated when the user selects a function from the operation panel 22 or the host apparatus 102. In the following, the operation of the image forming apparatus 10 will be described with respect to each of (1) the case where "scan function" is selected from the host apparatus 102, (2) the case where "print function" is selected from the host apparatus 102, and (3) the case where "copy function" is selected from the host apparatus 102.

(1) In the case where "scan function" is selected from the host apparatus 102

When "scan function" is selected from the host apparatus 102 by the user, a read instruction is outputted from the host apparatus 102 to the system control portion 12 through the network 100 and the scanner controller 26. When the read instruction is inputted to the system control portion 12, the read instruction is outputted from the system control portion 12 to the image input portion 14, and the read original document A is read as image data by the image input portion 14. The image data read by the image input portion 14 is outputted to the system control portion 12, and is transmitted to the host apparatus 102 through the scanner controller 26 and the network 100. The image data transmitted to the host apparatus 102 is stored in a memory device (not shown) provided in the inside of the host apparatus 102. At this time, discrimination information (information as to which image forming apparatus connected to the network 100 has read the image data) of the image forming apparatus having read the image data is linked to the image data and is stored. In the case where there are plural original documents, the foregoing operation is repeated a predetermined number of times, which is equal to the number of original documents. Here, with respect to the use of only "scan function", billing is not made.

(2) In the case where "print function" is selected from the host apparatus 102

When the user selects "print function" from the host apparatus 102, an output instruction is outputted from the host apparatus 102 to the system controller 12 through the network 100 and the printer controller 24, and image data for forming an output image is outputted from the host apparatus 102 to the system control portion 12. At this time, discrimination information of the image forming apparatus having read the image data is also outputted from the host apparatus 102 to the system control portion 12. In the case where plural output images are printed out, the foregoing processing is repeated a predetermined number of times, which is equal to the number of output images. When the output instruction and the image data are inputted to the system control portion 12, the output instruction and the image data are outputted from the system control portion 12 to the image output portion 16. The image output portion 16 forms the output image, and the output image is printed out on the sheet B. Incidentally, in the case where printout of plural sheets is made, the foregoing printout processing is repeated a necessary number of times.

In this case, discrimination information of the image forming apparatus having read the image data is outputted from the system control portion 12 to the discrimination portion 18, and the discrimination portion 18 judges whether the output image formed by the image output portion 16 is formed on the basis of the image data read by the image input portion 14. That is, in the case where the image data is the image data which has been read by the image input portion 14 and is stored in the storage device of the inside of the host apparatus 102, even in the case where "print function" is selected, since it is substantially equivalent to the use of "copy function", the discrimination portion 18 notifies the system control portion 12 that the used function is "copy function". In the case where the image data is not the image data read by the image input portion 14 (for example, in the case where it is image data read by another image forming apparatus connected to the network 100, in the case where it is image data newly formed by the host apparatus 102, and so on), the discrimination portion 18 notifies the system control portion 12 that the used function is "print function".

Thereafter, the information as to the used function is outputted from the system control portion 12 to the billing amount calculation portion 20, and the billing amount for the use of the function is calculated by the billing amount calculation portion 20. More particularly, in the case where the output image is formed by the image output portion 16 on the basis of the image data read by the image input portion 14 and is printed out, the billing amount for the use of "copy function" is added. In the case where the output image is formed by the image output portion 16 on the basis of the image data other than the image data read by the image input portion 14 and is printed out, the billing amount for the use of "print function" is added. Incidentally, the addition of the billing amount is performed every time the printout for one sheet from the image output portion 16 is completed.

The billing amount calculated by the billing amount calculation portion 20 is outputted to the system control portion 12 and is displayed on the operation panel 22.

(3) In the case where "copy function" is selected from the host apparatus 102

When "copy function" is selected from the host apparatus 102 by the user, a read instruction is first outputted from the host apparatus 102 to the system control portion 12 through the network 100 and the scanner controller 26. When the read instruction is inputted to the system control portion 12, the read instruction is outputted from the system control portion 12 to the image input portion 14, and the read original document A is read by the image input portion 14 as the image data. The image data read by the image input portion 14 is outputted to the system control portion 12, and is transmitted to the host apparatus 102 through the scanner controller 26 and the network 100. The image data transmitted to the host apparatus 102 is stored in the storage device (not shown) provided in the inside of the host apparatus 102. At this time, discrimination information of the image forming apparatus having read the image data is linked to the image data and is stored. Incidentally, in the case where there are plural original documents, the foregoing operation is repeated a predetermined number of times, which is equal to the number of original documents.

Subsequently, editing and processing (for example, gathering) of the image data is carried out by the host apparatus 102. When the editing and processing of the image data is completed, the output instruction is outputted from the host apparatus 102 to the system control portion 12 through the network 100 and the printer controller 24. Further, in order to form the output image, the edited and processed image data is outputted from the host apparatus 102 to the system control portion 12. At this time, discrimination information of the image forming apparatus having read the image data is also outputted from the host apparatus 102 to the system control portion 12. In the case where plural output images are printed out, the above processing is repeated a predetermined number of times, which is equal to the number of output images. When the output instruction and the image data are inputted to the system control portion 12, the output instruction and the image data are outputted from the system control portion 12 to the image output portion 16. The image output portion 16 forms an output image, and the output image is printed out on the sheet B. Incidentally, in the case where printout of plural sheets is made, the above printout processing is repeated a necessary number of times.

In this case, discrimination information of the image forming apparatus which has read the image data is outputted from the system control portion 12 to the discrimination portion 18, and the discrimination portion 18 judges whether the output image formed by the image output portion 16 is formed on the basis of the image data read by the image input portion 14. That is, in the case where "copy function" is selected, since the image data is the image data read by the image input portion 14, the discrimination portion 18 notifies the system control portion 12 that the used function is "copy function", and the billing amount calculation portion 20 adds the billing amount for the use of "copy function". The addition of the billing amount is made every time the printout for one sheet from the image output portion 16 is completed.

The billing amount calculated by the billing amount calculation portion 20 is outputted to the system control portion 12 and is displayed on the operation panel 22.

Incidentally, although the description has been made on the example where the image input portion 14, the image output portion 16, and the billing amount calculation portion 20 are provided in the same image forming apparatus 10, the image input portion 14, the image output portion 16, and the billing amount calculation portion 20 may be separate devices and constitute an image forming system as a whole. That is, for example, even when image data is read by another image input unit connected to the network 100, in the case where the image data is read by a specific image input unit, the discrimination portion 18 notifies the system control portion 12 that used function is "copy function".

Further, the image input unit itself is not connected to the image output portion 16, and even when image data read by the image input unit is once stored in a recording medium and the image data is outputted from the image output portion 16 through this recording medium, in the case where it is the image data read by a specific image input unit, the discrimination portion 18 may notify the system control portion 12 that the used function is "copy function".

Next, another embodiment of the present invention will be described below.

In the foregoing embodiment, although billing is made separately for "copy function" and "print function", the invention can also be applied to the case where billing is also made for "scan function".

That is, in the image forming apparatus 10 provided with the image input portion 14 and the image output portion 16, when "scan function" is selected from the host apparatus 102 by the user, a read instruction is outputted from the system control portion 12 to the image input portion 14, and the read original document A is read by the image input portion 14 as the image data. At this time, the system control portion 12 notifies the billing amount calculation portion 20 of "scan function", and the billing amount calculation portion 20 calculates a billing amount for the use of only "scan function".

In the case where the read image data is once transmitted to the host apparatus, and the image data edited and processed by the host apparatus is again transmitted to the image forming apparatus, and further, an output image is formed from the image data by using the print function of the image forming apparatus and is printed out, the discrimination portion 18 recognizes that the output image formed by the image output portion 16 is formed on the basis of the image data read by the image input portion 14, and the discrimination portion 18 notifies the system control portion 12 that the used function is "copy function", and notifies that the previously notified billing of "scan function" should be cancelled. The billing amount calculation portion 20 cancels the previously calculated billing of "scan function", and calculates the billing amount for the use of "copy function".

Incidentally, when the billing amount for "scan function" is X yen, the billing amount for "print function" is Y yen, and the billing amount for "copy function" is Z yen, X+Y>Z is set. That is, the billing amount for "copy function" may be set smaller than the sum of the billing amount for "scan function" and the billing amount for "print function". This is because although the case of using "copy function" substantially uses "scan function" and "print function", since these are used together, reduction is made.

Further, when the billing amount for "scan function" is X yen, the billing amount for "print function" is Y yen, and the billing amount for "copy function" is Z yen, X+Y=Z may be set. This is because the case of using "copy function" substantially uses "scan function" and "print function".

Subsequently, the operation and effect of the image forming apparatus of this embodiment will be described. The image forming apparatus 10 of the embodiment is provided with the discrimination portion 18, so that it becomes possible to recognize that the output image is formed on the basis of the image data read by the image input portion 14 and is printed out, or the output image is formed on the basis of the image data other than the image data read by the image input portion 14 and is printed out. Thus, it becomes possible to correctly recognize the function substantially used by the user, for example, whether the user substantially uses "copy function" or "print function".

Besides, since the image forming apparatus 10 of the embodiment is provided with the billing amount calculation portion 20 for calculating the billing amount on the basis of the discrimination result of the discrimination portion 18, it becomes possible to calculate a proper billing amount for each of the case where the user substantially uses "copy function" and the case where the user uses only "print function".

Figure 2:
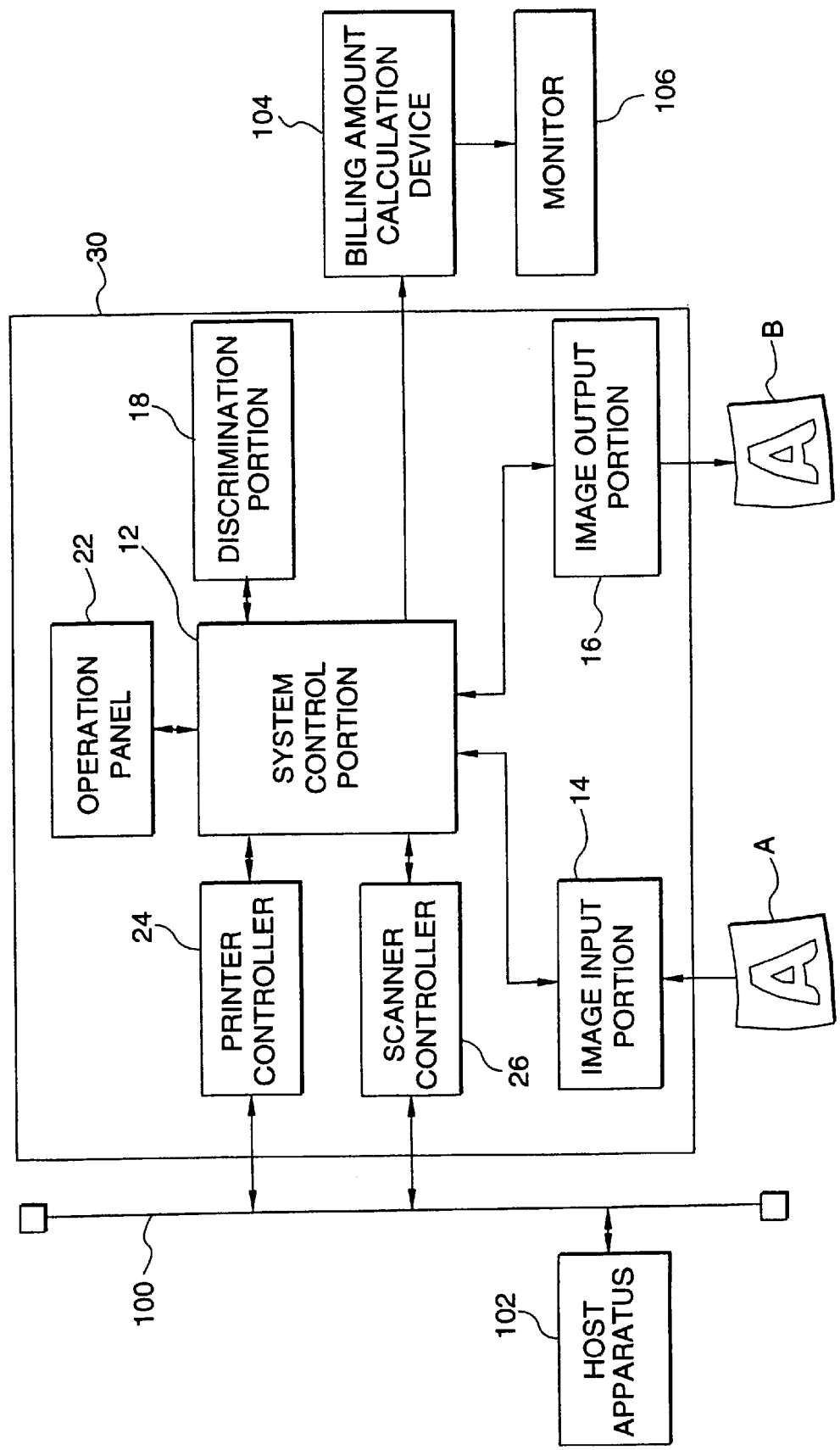
FIG. 2 is another structural view of an image forming apparatus.

Although the image forming apparatus 10 of the embodiment is formed to include the billing amount calculation portion 20, as shown in FIG. 2, an image forming apparatus 30 which does not include the billing amount calculation portion may be formed. In this case, information as to a used function notified from a discrimination portion 18 to a system control portion 12 is outputted from the system control portion 12 to an externally provided billing amount calculation device 104, and a billing amount calculated by the billing amount calculation device 104 is displayed on a monitor 106.

As described above, the image forming apparatus of the present invention is provided with the discrimination unit for discriminating whether the output image is formed on the basis of the image data read by the image reading unit, so that it becomes possible to correctly recognize that the output image is formed on the basis of the image data read by the image reading unit and is printed out, or the output image is formed on the basis of the image data other than the image data read by the image reading unit and is printed out. As a result, it becomes possible to correctly recognize the function which is substantially used by the user.

Besides, the image forming apparatus of the present invention is provided with the billing amount calculation unit for calculating the billing amount for the use of the function of reading an original document as image data and/or the function of forming and printing out an output image, so that it becomes possible to calculate a proper billing amount for each of the case where both the function of reading out the original document as the image data and the function of forming and printing output the output image are used, and the case where only the function of forming and printing out the output image is used.

What is claimed is:

1. An image forming apparatus comprising:

image reading means for reading an original document as image data;

image output means for forming an output image on the basis of inputted image data and for printing out the output image; and discrimination means for discriminating whether the output image is formed on the basis of the image data read by the image reading means.

2. An image forming apparatus according to claim 1, further comprising:

billing amount calculation means for calculating, on the basis of a discrimination result of the discrimination means, a billing amount for use of a function of reading the original document as the image data and/or a function of forming and printing out the output image.

3. An image forming apparatus according to claim 2, wherein when the output image is formed on the basis of the image data read by the image reading means and is printed out, the billing amount calculation means adds the billing amount for the use of the function of reading the original document as the image data and the function of forming and printing out the output image, and when the output image is formed on the basis of the image data other than the image data read by the image reading means and is printed out, the billing amount calculation means adds the billing amount for the use of the function of forming and printing out the output image.

4. An image forming apparatus according to claim 2, wherein when the output image is formed on the basis of the image data read by the image reading means and is printed out, the billing amount calculation means adds the billing amount for the use of the function of reading the original document as the image data and the billing amount for the use of the function of forming and printing out the output image, and when the output image is formed on the basis of the image data other than the image data read by the image reading means and is printed out, the billing amount calculation means adds the billing amount for the use of the function of forming and printing out the output image.

5. An image forming apparatus according to claim 2, wherein when the output image is formed on the basis of the image data read by the image reading means and is printed out, the billing amount calculation means adds a billing amount smaller than a sum of the billing amount for the use of the function of reading the original document as the image data and the billing amount for the use of the function of forming and printing out the output image, and when the output image is formed on the basis of image data other than the image data read by the image reading means and is printed out, the billing amount calculation means adds the billing amount for the use of the function of forming and printing out the output image.

6. An image forming system comprising:

at least one image reading means for reading an original document as image data;

image output means for forming an output image on the basis of inputted image data and printing out the output image; and discrimination means for discriminating whether the output image is formed on the basis of the image data read by a prescribed image reading means among the image reading means.

7. An image forming system according to claim 6, further comprising:

billing amount calculation means for calculating, on the basis of a discrimination result of the discrimination means, a billing amount for use of a function of reading the original document as the image data and/or a function of forming and printing out the output image.

8. An image forming system according to claim 7, wherein when the output image is formed on the basis of the image data read by the prescribed image reading means among the image reading means and is printed out, the billing amount calculation means adds the billing amount for the use of the function of reading the original document as the image data and the function of forming and printing out the output image, and when the output image is formed on the basis of image data other than the image data read by the prescribed image reading means among the image reading means and is printed out, the billing amount calculation means adds the billing amount for the use of the function of forming and printing out the output image.

9. An image forming system according to claim 7, wherein when the output image is formed on the basis of the image data read by the prescribed image reading means among the image reading means and is printed out, the billing amount calculation means adds the billing amount for the use of the function of reading the original document as the image data and the billing amount for the use of the function of forming and printing out the output image, and when the output image is formed on the basis of image data other than the image data read by the prescribed image reading means among the image reading means and is printed out, the billing amount calculation means adds the billing amount for the use of the function of forming and printing out the output image.

10. An image forming system according to claim 7, wherein when the output image is formed on the basis of the image data read by the prescribed image reading means among the image reading means and is printed out, the billing amount calculation means adds a billing amount smaller than a sum of the billing amount for the use of the function of reading the original document as the image data and the billing amount for the use of the function of forming and printing out the output image, and when the output image is formed on the basis of image data other than the image data read by the prescribed image reading means among the image reading means and is printed out, the billing amount calculation means adds the billing amount for the use of the function of forming and printing out the output image.

* * * * *